Nov. 30, 1948.　　　　C. F. WALLACE　　　　2,455,200
LIQUID LEVEL INDICATOR
Filed Jan. 6, 1944　　　　　　　　　　　　5 Sheets-Sheet 1
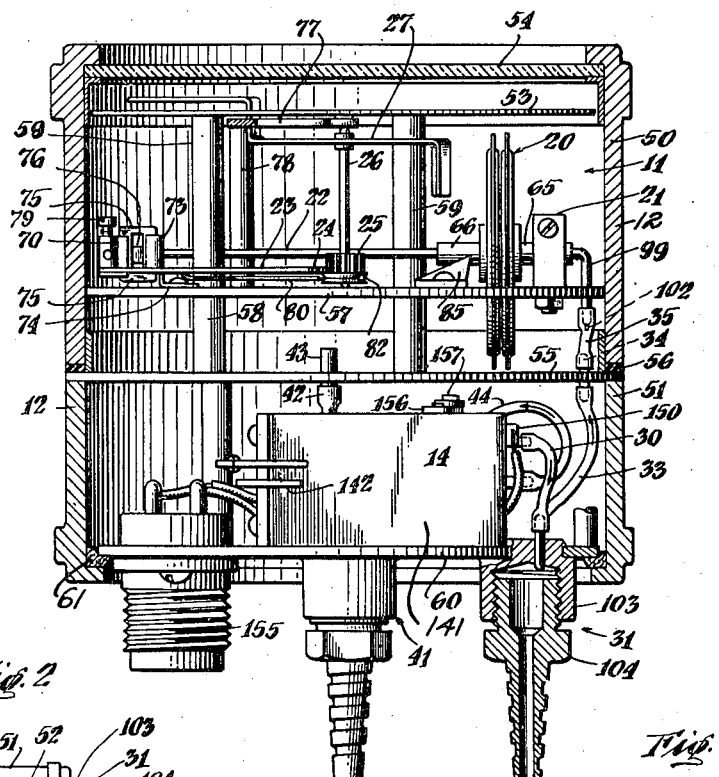
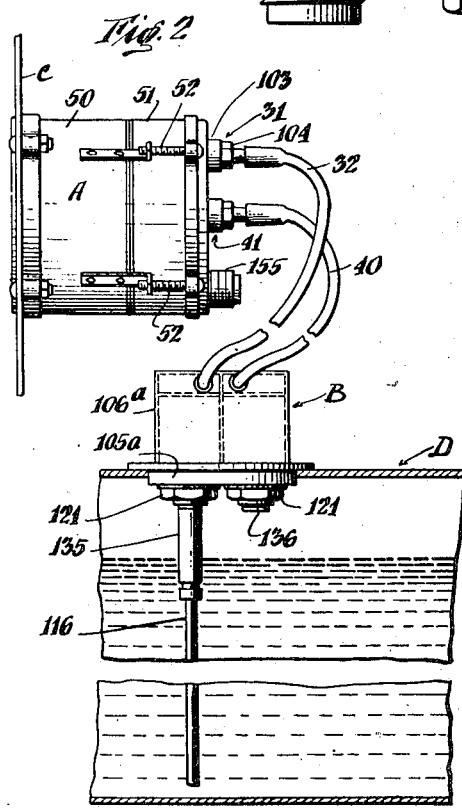
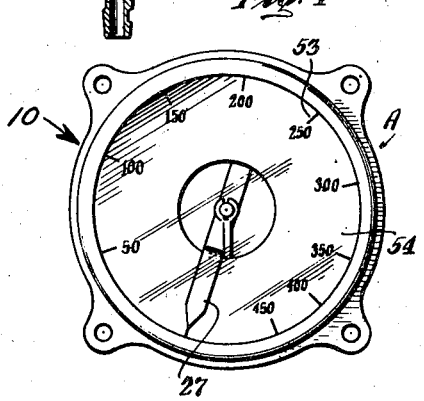
INVENTOR.
Charles F. Wallace
BY Arthur L. Kent
his ATTORNEY Nov. 30, 1948. C. F. WALLACE 2,455,200
LIQUID LEVEL INDICATOR
Filed Jan. 6, 1944 5 Sheets-Sheet 2

INVENTOR.
Charles F. Wallace
BY
Arthur L. Kuert
his ATTORNEY

Nov. 30, 1948.  C. F. WALLACE  2,455,200
LIQUID LEVEL INDICATOR
Filed Jan. 6, 1944  5 Sheets-Sheet 3

INVENTOR.
Charlie F. Wallace
BY Arthur L. Kent
his ATTORNEY

Nov. 30, 1948.     C. F. WALLACE     2,455,200
LIQUID LEVEL INDICATOR
Filed Jan. 6, 1944     5 Sheets-Sheet 4
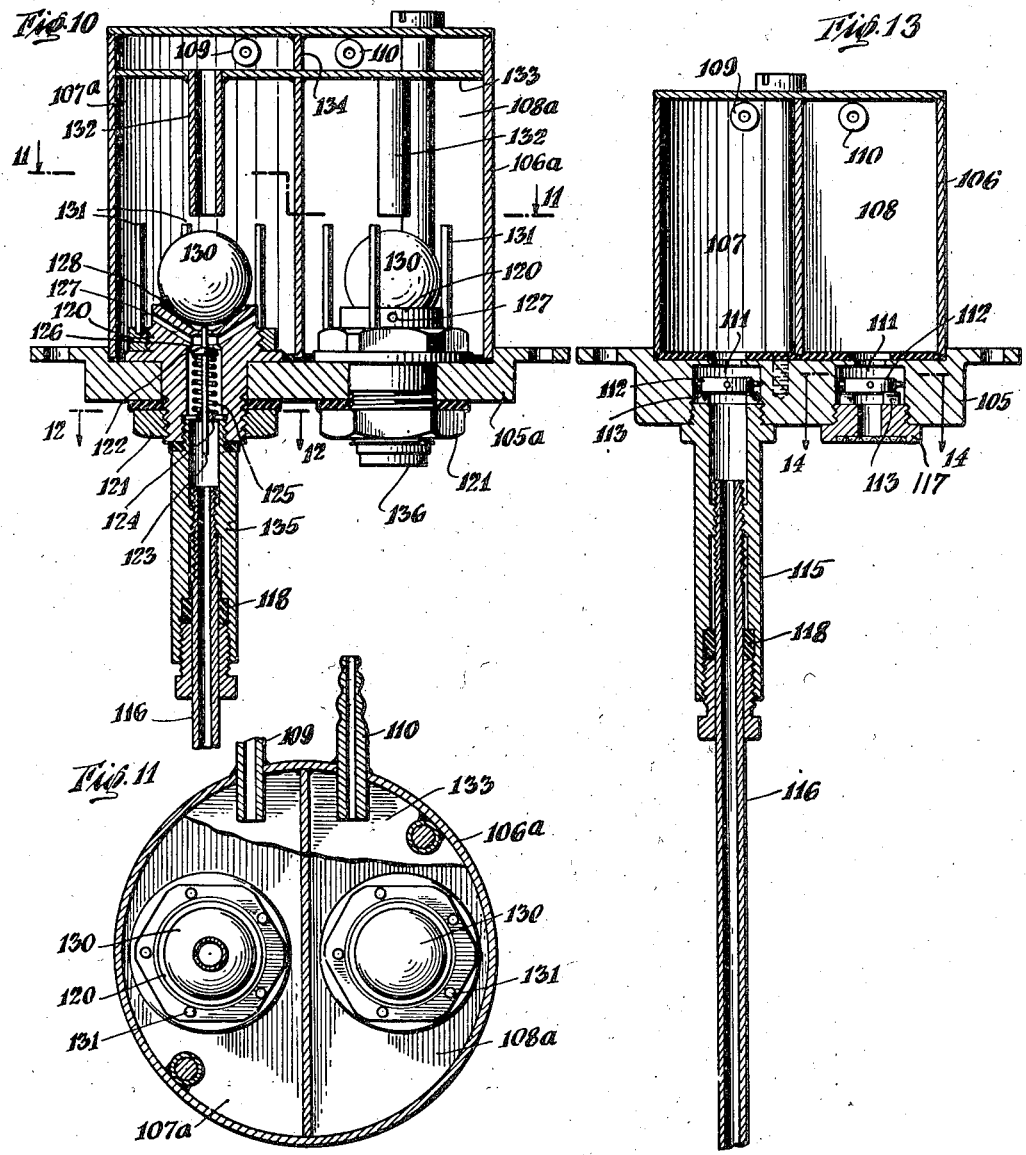
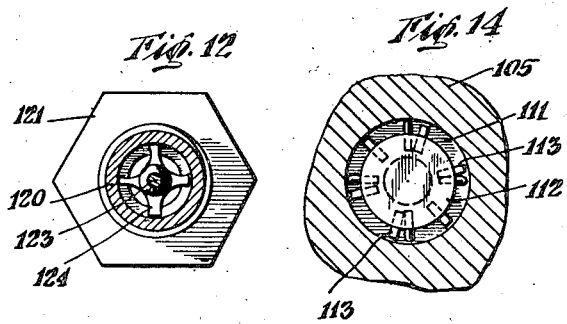
INVENTOR.
Charles F. Wallace
BY
his ATTORNEY Nov. 30, 1948. C. F. WALLACE 2,455,200
LIQUID LEVEL INDICATOR
Filed Jan. 6, 1944 5 Sheets—Sheet 5

INVENTOR.
Charles F. Wallace
BY Arthur L. Kent
his ATTORNEY

Patented Nov. 30, 1948

2,455,200

UNITED STATES PATENT OFFICE 2,455,200

LIQUID LEVEL INDICATOR

Charles F. Wallace, Westfield, N. J., assignor to Wallace & Tiernan Products, Inc., Belleville, N. J., a corporation of New Jersey Application January 6, 1944, Serial No. 517,180

9 Claims. (Cl. 73—299)

This invention relates to liquid level indicators of the hydrostatic pressure type. More particularly, the invention relates to apparatus which in response to the difference between the hydrostatic pressure at a given point in the liquid in a container and the pressure in the space directly above the liquid indicates the liquid level in the container, or the amount in volume or weight of liquid in the container, according to the calibration of the pressure gauge forming a part of the apparatus. The object of the invention is to provide an improved instrument or apparatus of this kind which shall be capable of continuous operation for long periods of time without requiring attention, and shall be reliable in operation and accurate in its gauge indications, and shall be of small size and light weight, and, although electrically operated, shall operate with an extremely low current consumption.

The invention has been made especially with the idea of providing an instrument adapted for use on airplanes for indicating the amount of gasoline or other fuel liquid in a fuel tank or the amount of oil. Liquid level indicators, or gauges, according to the invention are, however, adapted for use wherever it is desired to have a continuous indication of the liquid level or amount of liquid in a more or less distant fuel or other tank, although certain features of the invention are especially designed for use of the apparatus where the liquid container is unsteady so that the liquid is more or less disturbed, such as in the fuel tanks of land motor vehicles, boats, and airplanes, and especially the tanks or airplanes where trouble from excessive tilting of the plane, and even turning upside down, must be guarded against to avoid damage to the apparatus from flooding of the air lines or otherwise.

To these ends, the invention consists in various features of construction, arrangement and combination of parts, all of which will be made clear by the following description and thereafter particularly pointed out in the claims.

As a full understanding of the invention can best be given by a detailed description of an apparatus embodying tne various features of the invention in the form now considered best, such a description will now be given in connection with the accompanying drawings showing an apparatus especially designed for use on airplanes, and an alternative form of one part thereof, in which drawings:

Fig. 1 is a face view of the dial of the pressure gauge forming part of the apparatus;

Fig. 2 is a side view indicating the instrument board of an airplane and a gasoline tank, and showing the instrument board member and tank member of the apparatus and the connecting tubes;

Fig. 3 is a view showing the instrument board member of the apparatus with the casing thereof in section and the contained operating parts mostly in full side view;

Fig. 10 is a sectional view of the tank member of the apparatus;

Fig. 11 is a sectional view taken partly on line 11—11 of Fig. 10;

Fig. 12 is a detail sectional view taken on line 12—12 of Fig. 10;

Fig. 13 is a sectional view of an alternative form of the tank member of the apparatus;

Fig. 14 is a detail sectional view taken on line 14—14 of Fig. 13; and

Referring first to Figs. 1 and 2, the apparatus as shown consists of a member A adapted to be mounted for convenient observation, as on the instrument board of an airplane, and which comprises a pressure gauge, an air pump, and an electromagnetic motor for operating the air pump, all mounted in a casing having a dial face for the pressure gauge; and a member B to be mounted on the container the liquid in which is to be measured; and two tubes connecting the members A and B, one being the pressure line which makes connection to a tube of member B extending to a zero point in the tank and the other being a static line which makes connection to an outlet of member B to the space in the tank above the liquid level. Fig. 2 shows part of an instrument board C with member A mounted in an opening therein, and part of a tank D with member B mounted in an opening in its top wall.

Figure 15:
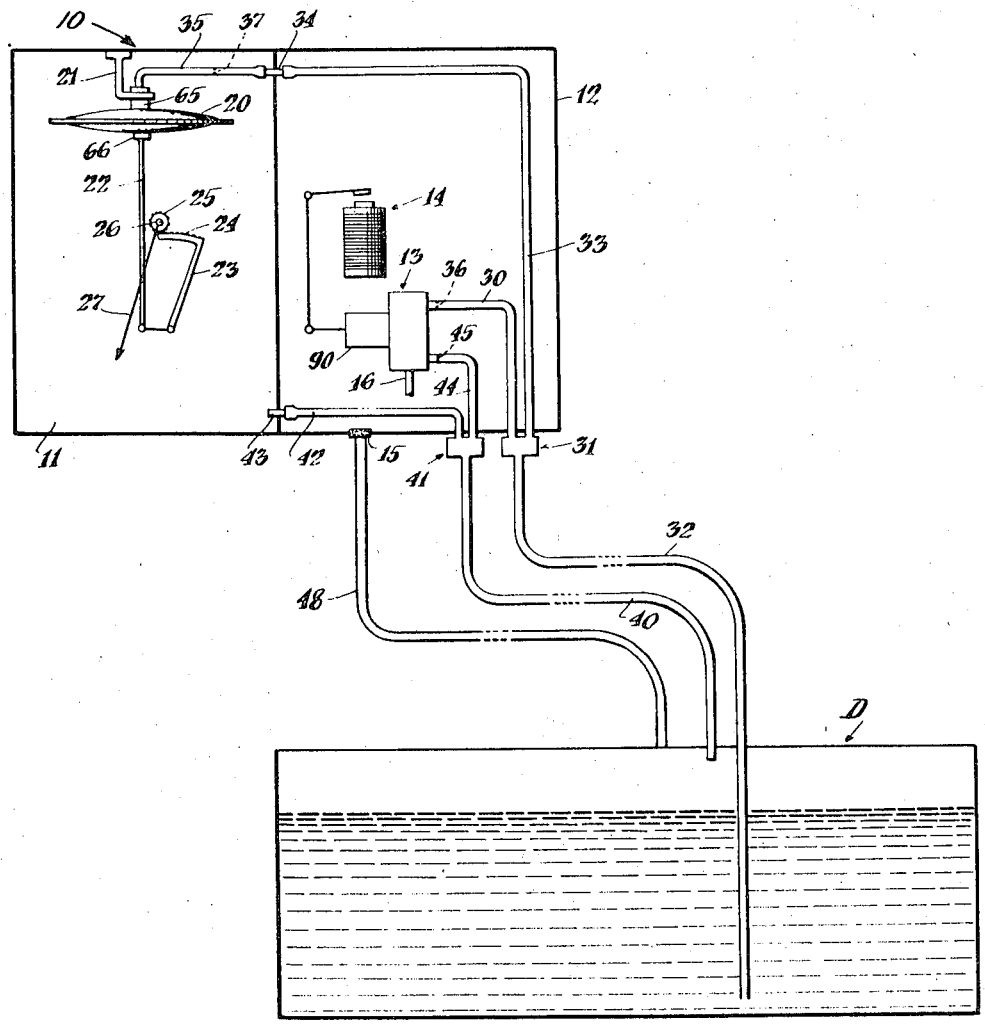
Fig. 15 is a diagrammatic view of an apparatus according to the invention.

Referring now to Fig. 15 which illustrates diagrammatically an apparatus according to the invention but without certain features of the invention which contribute to the accuracy, sensitiveness, reliability and low operating cost and other properties and advantages of the apparatus: The operating parts of the pressure gauge 10 are mounted within a hermetically sealed chamber 11 within the casing 12 which encloses also the air pump 13 and the electromagnetic motor 14 by which the pump is operated. The chamber within which the pump and motor are mounted is a sealed chamber except for a filter-protected opening 15 for admitting air to the suction inlet 16 of the pump.

The pressure gauge comprises a pressure responsive element, or capsule, 20 of conventional form, consisting of two somewhat dished corrugated diaphragms of metal of high elastic limit, joined together at their peripheries to form a chamber. The capsule has a mounting stud extending from the center of one side rigidly mounted, as in a bracket 21. From the other side of the capsule an operating rod 22 extends and is pivotally connected to a short arm of a lever 23 the long arm of which carries a gear segment 24 which engages a pinion 25 on a spindle 26 by which the gauge pointer 27 is carried. The pointer 27 will thus be moved and positioned according to the pressure difference between the inside of the capsule and the chamber 11, to indicate this pressure differential on a suitably calibrated dial not indicated in Fig. 15.

From the pressure end of the air pump, a tube 30 extends to a chambered fitting 31 from which a tube 32 extends to the liquid container, or tank, D with its outlet end located at a zero point near the bottom of the tank. A tube 33 leads from the chambered fitting 31 to a nipple 34 sealed in the wall of chamber 11, from which connection is made by a tube 35 to the interior of the capsule. When the pump is in operation, air pressure is built up in the tube 32 and in the chamber of fitting 31 until the liquid standing in the tube has been forced down to permit air to escape from the end of the tube and the pressure in the tube is then maintained equal to the hydrostatic head at the end of the tube. The pressure in the fitting 31 is transferred to the interior of the capsule 20 through the connecting tubes 33, 34 and 35. A restriction 36 is provided in the connection between the pump and the chambered fitting 31 which permits only a small flow of air through tube 32, so that there will be only a very small pressure drop in the tube even when it is comparatively long, and that the load on the pump will be very small. A damping restriction 37 is provided in the tube 35 to prevent vibration of the pointer from the pulsations in the air pressure.

The difference between the pressure at the outlet end of tube 32 and the pressure in the tank above the liquid level will vary according to the distance from the tube outlet to the liquid level above it, and this pressure difference is a measure of the liquid level, that is, of the height of the liquid level above the tube outlet. The pressure gauge will make an indication according to the difference in pressure between the inside of the capsule and the pressure in the chamber 11. A pressure equalizing connection is, therefore, provided between the chamber 11 and the space in the tank above the liquid level by means of a tube 40 open to the space in the tank above the liquid level and leading to a chambered fitting 41 from which a tube 42 leads to a nipple 43 sealed in the wall of chamber 11.

With the casing 12 containing the pressure gauge, air pump and motor located close to the tank, and with the tube connection between the zero point in the tank and the capsule 20 large enough, the pressure difference controlling the gauge pointer would be equal to the difference between the pressure in the liquid at the outlet of tube 32 and the space in the tank above the liquid level. With the casing containing the operating devices at a considerable distance from the tank, as is the case on an airplane, there will be some pressure drop through the pressure tube 32, so that the pressure transmitted to the capsule will be somewhat greater than the pressure at the outlet end of the tube 32, and the gauge operating pressure difference will be greater than the pressure difference in the tank. To avoid substantially this discrepancy, and to avoid also accumulation of fuel liquid from condensation in tube 40, and to permit the use of smaller tubing, a connection is made, by tube 44, from the pressure end of the pump to the chambered fitting 41. A restriction 45 is provided in this connection for the same purpose as the restriction 36 in the connection between the pump and the chambered fitting 31, and the two restrictions should most desirably be of the same or nearly the same effective size. There will thus be an almost equal flow of air through the pressure tube 32 and the static tube 40, and, therefore, except for an infinitesimal and disregardable difference, the same pressure drop in both tubes, with the result that the gauge operating pressure difference will be substantially the same as the tank pressure difference. The pressure gauge pointed will thus indicate correctly on a properly calibrated dial scale.

The dial scale may be marked to show the liquid level in the tank, or the gauge may be calibrated for use with tanks of a given size and shape to indicate volume or weight of liquid as a function of liquid level. The indications of the gauge will be correct whether the tank be vented to the atmosphere or be a sealed tank with pressure maintained in the space above the liquid level.

When the apparatus is used for measuring the liquid in a sealed tank in which pressure is maintained in the space above the liquid, the pressure at the suction inlet of the air pump should, in order to avoid overloading the pump, be substantially the same as the pressure in the gas space of the tank. This is conveniently accomplished by providing a pressure equalizing tube 48 connecting the gas space of the tank with a filter-protected inlet to the chamber containing the pump, as indicated in Fig. 15. Also, if, as occurs on high altitude airplanes, the air pressure in the cabin or other place where the air pump is mounted is considerably greater than the atmospheric pressure and the tank is vented to the atmosphere, there should be a tube connection from the suction inlet of the pump or from the closed chamber containing the pump to an outside point, so that the pressure at the suction inlet of the pump will be substantially the same as the pressure in the gas space of the tank.

Figure 4:
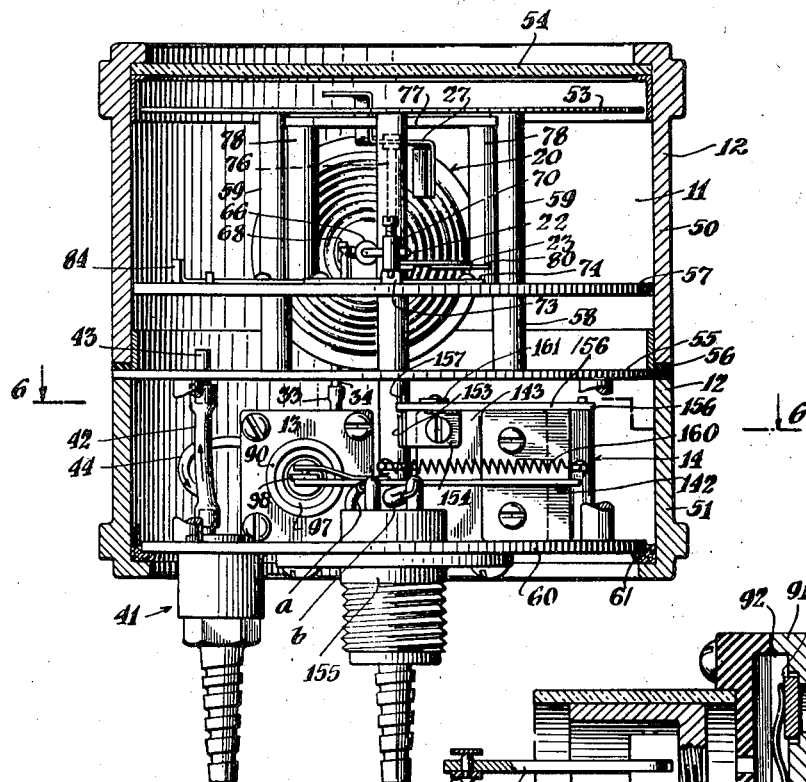
Fig. 4 is a similar view looking from the left of Fig. 3.

Referring now to Figs. 3 to 13, these figures show the various parts of an apparatus as now made, embodying the invention as illustrated diagrammatically by Fig. 15. Referring first to Figs. 3 and 4, the casing for the pressure gauge, air pump and motor is formed by two cylindrical parts 50 and 51, which are secured together by screws 52. The front part 50 has a sight opening for the dial plate 53, closed by a glass or other transparent disc 54 which is hermetically sealed against a shoulder at the front edge of the casing member. Between the two parts 50 and 51 of the casing a circular plate 55 is clamped and sealed by a gasket 56, thus providing the hermetically sealed chamber 11 for the operating parts of the pressure gauge which are carried by a plate 57 supported from the plate 55 by posts 58, the dial plate 53 being supported by posts 59. The open outer end of the casing part 51 is closed by a circular plate 60 except for space around the edge of the plate which is filled by a ring 61 of felt or other suitable porous material which admits filtered air for the intake of the air pump. Plate 60 has mounted on it the air pump and the motor, and is detachably secured to plate 55 so that by releasing the casing part 51 from the part 50 and removing it, the plates 60, 55 and 57 and parts mounted thereon may all be removed together from the casing part 50 as a complete unit, and after removal the plates may be separated for convenient access to the parts mounted on them.

Referring now to the pressure gauge, shown by Figs. 3, 4, 5 and 9, the pressure responsive member 20 is, as shown and most desirably, a double capsule member the spaces within which are connected in the usual manner. Any number of connected capsules may be used according to the intended use of the apparatus and material of which parts are made. The pressure member is rigidly mounted on a bracket 21 extending from plate 57 which holds between releasable clamping members a tubular mounting stud 65 extending centrally from one side of the pressure member. The outside plate at the other side of the pressure member carries a thimble 66 into which one end of the operating rod 22 extends and is held in longitudinal adjustment by a screw 68. The outer end of rod 22 is bent at approximately right angles and is rigidly connected to a part 70, to which also is rigidly connected the bent end of lever 23 which carries the segment gear 24 at its free end.

The part 70 is pivotally connected to a stud 73 projecting upward from a small plate 74 secured to plate 57, the pivotal connection between part 70 and stud 73 being by means of two thin plates, or leaves, 75 of spring metal, which may be beryllium-copper, Phosphor-bronze, or the like, these plates being, in the construction shown, the two side members of a piece of the very thin metal cut to form a frame the connecting end pieces of which are rigidly clamped, one in the part 70, the other in the stud 73. The supporting pivotal connection thus provided for the lever 23 permits free pivotal movement of the lever in one plane without any play in the pivotal connection, while at the same time holding the lever against movement in other planes. The operating rod 22 has a very thin flattened portion 76 adjacent its bent end, this flattened portion serving as a pivotal connection between the main portion of the rod and its bent end portion, so that there is provided, in effect, a pivotal connection between the rod 22 and a short arm of the lever 23, the bent end of the rod, which is rigidly connected with the pivot end of lever 23, forming the short arm of the lever. The segment gear 24 engages a pinion 25 on a spindle 26 which carries the pointer 27, the spindle extending between and having pivot bearings in the plate 57 and in a bracket 77 carried by posts 78 extending from plate 57. The connection between the bent end of rod 22 and lever 23 is made by having the bent end of rod 22 adjustably secured in the part 70 by a set screw 79, so that the length of the short arm of the lever may thus be adjusted to vary the magnitude of movement given to the pointer for a given expansion or contraction of the pressure element.

In order to prevent back-lash between the segment gear and the pinion, the lever 23 carries a light spring 80 from which a fine strand or filament 81 of suitable material extends to and around and is secured to a pulley 82 on the spindle 26 adjacent pinion 25, the diameter of the groove of the pulley being the same as the pitch diameter of the pinion. The slight torque exerted on the spindle by spring 80 will thus be the same for all positions of lever 23. A light spring 83 connected at one end to the thimble 66 of the pressure element and at the other end to an adjustable lever 84 serves to put a slight tension on the thimble 66 in the direction in which it is moved by increase of pressure in the pressure element. Adjustment of the tension of spring 83 by means of the lever 84 serves to bring the pointer 27 accurately to the zero point of the gauge scale when there is equal pressure at the outlet ends of the pressure tube 32 and the static tube 40. A stop 85 is desirably provided for limiting the expanding movement of the pressure element so as to avoid damage through excess movement under possible excess pressure difference.

Figure 7:
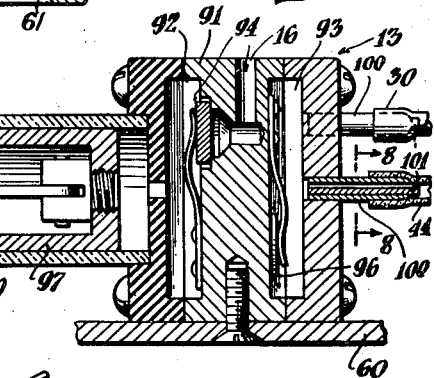
Fig. 7 is an enlarged detail sectional view of the air pump.
Figure 9:
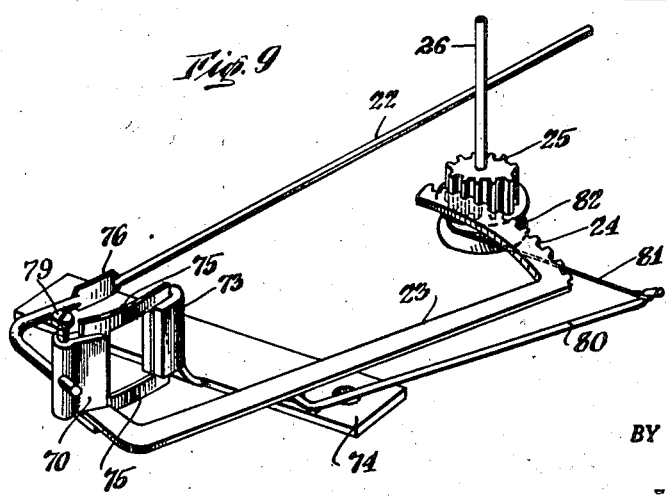
Fig. 9 is an enlarged perspective view of certain parts of the apparatus.
Figure 8:
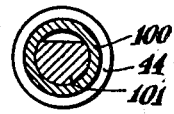
Fig. 8 is a still further enlarged detail sectional view taken on line 8—8 of Fig. 7.
Figure 5:
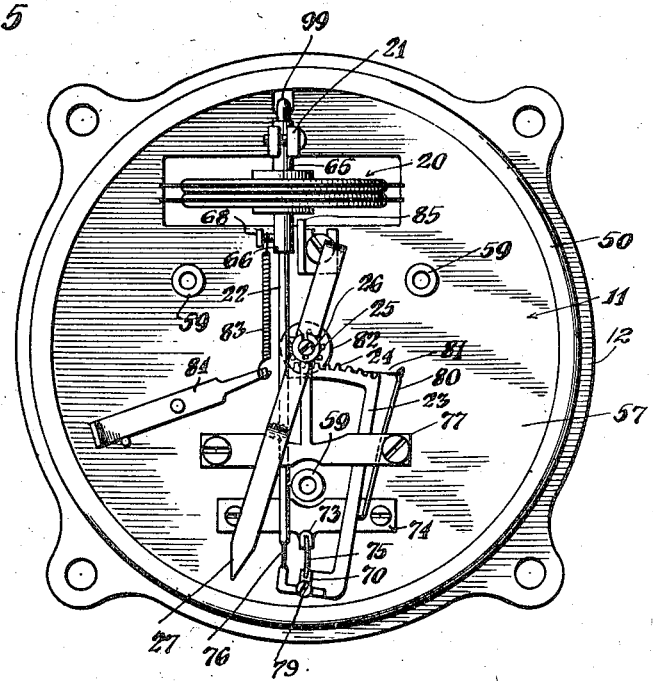
Fig. 5 is a top view with the dial plate removed.
Figure 6:
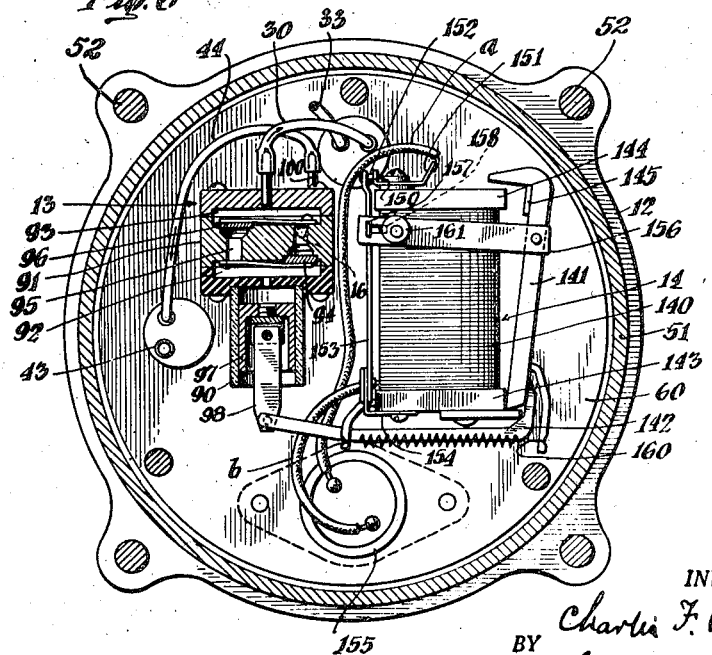
Fig. 6 is a section taken on line 6—6 of Fig. 4.

Any suitable small air pump may be used. Only low capacity is required, but the pump should be of high efficiency requiring relatively low operating power. The pump is, however, most desirably, one such as shown by Figs. 4, 6 and 7. This pump has a small cylinder 90, one end of which is set into the end of a valve body 91, which is formed in three pieces shaped to provide a suction chamber 92 and a pressure chamber 93 with a port leading from the cylinder to the suction chamber. The intake port 16 connects to the suction chamber past a spring-closed inlet valve 94, and a port 95 leads from the suction chamber to the pressure chamber past a spring-closed outlet valve 96. The piston 97 is preferably a packless piston which requires no lubrication. The cylinder and piston should be of materials having the same, or almost the same, coefficient of expansion. The piston has a pivotally connected connecting rod 98 through which it is reciprocated by the motor.

The connecting tubes 30, 33, 42 and 44 are in the apparatus shown and most desirably of flexible tubing, and are easily disconnected when the plate 60 and parts mounted thereon are to be separated from the plate 55. The tube 35 between the nipple 34 in the plate 55 and the pressure element 20 includes a piece of disconnectable flexible tubing between the nipple 34 and a tube 99 of rigid material extending from the tubular mounting stud 65 of the pressure element.

The tube 30, through which connection is made from the pump to the chambered fitting 31, and the tube 44, through which connection is made from the pump to the chambered fitting 41, are each connected to the pressure chamber of the pump through a tubular nipple 100 over the end of which the tube fits. Each of these nipples has inserted in it a piece of wire or small rod 101 which fits and closes the bore of the nozzle except for being slightly flattened or grooved on one side, as appears from Figs. 7 and 8. There is thus provided the restrictions 36 and 45 between the pump and the chambered fittings 31 and 41. The advantage of providing these restrictions in this way is that when the flexible tubes are disconnected from the nipples 100 the rods 101 may be removed, leaving a passage through the nipples of sufficient size so that they may be readily cleaned. The restriction 37 for damping the pressure element 20 is also provided by a bore-restricting rod 102 inserted in the end of the tube 99, the end of this rod being indicated in Fig. 3.

The chambered fitting 31 is formed of a cup shaped part 103 which is secured in an opening in plate 60 and which has two nipples extending from its end wall to which the connecting tubes 30 and 33 are connected, and a tubular part 104 screwed into the part 103 and which has its outer end shaped to receive the end of the pressure tube 32. The fitting 41 is like fitting 31, providing connections for the connecting tubes 42 and 44 and for the static tube 40.

The tank member B of the apparatus provides means for preventing the entrance of tank liquid into the connecting tubes 32 and 40 as the result of tilting or jarring of the tank. It is especially important that such means be provided when the tank liquid is one, such as gasoline, which would not be blown out of the tubes by the small air flow therein. For most uses of the apparatus, means providing for each tube a flow-operated check valve and trap chamber as shown by Figs. 13 and 14 will serve, but a tank member such as shown by Figs. 10, 11 and 12 is preferred, especially for use where the tank is liable to be turned completely over as on some airplanes, such as fighter planes.

The device shown in Figs. 13 and 14 comprises a base piece 105 adapted to be set and secured in an opening in the top wall of the tank, and a small partitioned casing 106 detachably secured to the outer side of the base piece to provide two sealed trap chambers 107 and 108, to one of which the pressure tube 32 makes connection through a nipple 109 and to the other of which the static tube 40 makes connection through a nipple 110. From each of the trap chambers a port leads to a small valve chamber 111 in the base piece in which there is a valve disc 112 of light material such as cork which normally rests in open-valve position on spaced supports 113 the spaces between which lead to an opening in the bottom of the valve chamber. The bottom of the valve chamber for the trap chamber 107 is formed by the threaded upper end of a tubular fitting 115 from which the immersion tube 116 extends downward into the liquid in the tank, the spaced supports 113 being formed on the upper end of the tubular fitting. The bottom of the valve chamber for the trap chamber 108 is formed by a short threaded plug 117 having a central opening through which the valve chamber is in communication with the gas space of the tank. When the valve discs 112 rest on the spaced supports 113, the valves are open for air flow through the valve chambers; but liquid entering the valve chambers will cause the valve discs to rise and close the ports to the trap chambers. If any liquid gets past the valve into either trap chamber, it will be trapped there, and will flow out again through the valve chamber when the valve disc is back in its open position. The tube 116 has a screw connection in the bore of the tubular fitting 115 which permits of adjustment of the tube to bring its lower end to a desired zero point in the tank, and a stuffing box 118 is provided to seal the tube with the fitting 115 and also to lock the tube in its position of longitudinal adjustment.

Referring now to Figs. 10, 11 and 12, the tank device shown by these figures comprises, like the device of Figs. 13 and 14, a base piece 105ᵃ adapted to be secured in an opening in the top wall of the tank, and a partitioned casing 106ᵃ providing two sealed trap chambers 107ᵃ and 108ᵃ to one of which the pressure tube 32 makes connection through a nipple 109 and to the other of which the static tube 40 makes connection through a nipple 110. Instead, however, of the simple check valves of Figs. 13 and 14, valves controlled by tiltable weights are provided.

In the preferred construction shown, and referring first to the means, shown in section in Fig. 10, for protecting the pressure tube 32, a flanged valve block 120 is secured by a nut 121 in an opening in that part of the base piece 105ᵃ which forms the bottom of trap chamber 107ᵃ. In the valve chamber of the block there is a valve disc 122 carried by a rod 123, slidingly guided by a spider 124 below the valve and extending through an upper guide hole in the top of the block. A helical spring 125 between the valve disc and the spider presses upward on the valve disc tending to force it against an annular seat 126. Ports 127 connect the trap chamber with the upper end of the valve chamber above the valve seat. The upper face of the valve block is shaped to provide an annular seat 128 concentric with the upper guide hole for a spherical weight 130 which when seated bears on the end of the valve rod to force the valve disc away from its seat against the pressure of the spring. The valve will thus be open whenever the ball is seated, but when the ball is tilted or rolled to any considerable degree on its seat the valve rod will be released and the valve will be closed by the spring. Movement of the ball from its seated position is limited by a cage formed by circumferentially spaced vertical rods 131 and the lower end of an air tube 132 which extends downward into the trap chamber. The ball is thus free to move to release the valve rod and permit the valve to be closed by its spring, but after being unseated by tilting or jarring of the tank, will quickly return to its normal seated, valve opening, position when the tank is in normal position. A cage having circumferentially spaced engaging members, such as the rods 131, instead of a circumferentially continuous surface to be engaged by the ball, has the advantage that it stops any circular movement of the ball which mighth result from vibration or other rhythmic movement of the tank. The ball seat 128 is most desirably, though not necessarily, of rather flat concave conical form as shown.

A partition plate 133 and the upper end of the main partition 134 provide two connecting spaces, one connecting the nipple 109 with the tube 132 in chamber 107ᵃ and the other connecting nipple 110 with the tube 132 in chamber 108ᵃ. The valve chamber of block 120 connects with the bore of a tubular fitting 135 from which the immersion tube 116 extends downward in the tank liquid. The upper end of fitting 135 screws into the block and clamps the spider 124 against a shoulder in the block. The tube 116 is adjustable in the tubular fitting and is sealed by a stuffing box 118 as in the device of Fig. 13.

The means, shown in elevation in Fig. 10, for protecting the static tube 40 is the same as the means for protecting tube 32 except that, instead of the tubular fitting 135 which carries the immersion tube, there is a short fitting 136 which serves to hold the spider 124 and through which connection is made from the trap chamber 108ᵃ through the valve block to the gas space of the tank.

As will be understood, in the event of any tilting or jarring of the tank causing a disturbance of the tank liquid which mighth otherwise result in liquid entering either of the tubes 32 or 40, the valves 122 will be released by movement of the balls 130 and will immediately be closed by their springs; and, if the tank is turned completely over, the balls will fall against the ends of the air tubes 132, releasing the valves and also shielding the open ends of the tubes from any liquid which may have passed the valves. In any case, any small amount of liquid entering the trap chambers will be trapped therein and prevented from reaching the tubes 32 and 40.

For driving the air pump, any suitable small electric motor may be provided, but the motor is most desirably one such as shown by Fig. 6 and appearing also in Figs. 3 and 4, and this motor, and especially its combination with the air pump, forms a feature of the invention. The motor is a vibratory armature electromagnetic motor, comprising an electromagnet 140 mounted on the plate 60, which is of insulating material, and a vibratory armature 141 by which the piston of the air pump is reciprocated through an arm 142 which extends from the pivot end of the armature and the free end of which is pivotally connected to the connecting rod 98 extending from the pump piston. One end of the armature pivots against the pole piece 143 and its free end has a bent over end which extends close to the face of the pole piece 144. There is thus provided a small air gap although the armature has a comparatively large movement. The armature has a bumper piece 145 of non-magnetic material. The magnet is mounted on the plate 60 of insulating material.

The magnet circuit is controlled by a make-and-break device actuated by movement of the armature 141. This device comprises a fixed contact 150 formed by the end of a plate 151 mounted on but insulated from the pole piece 144, and a movable contact 152 carried by a flat rod 153 of magnetic material which is pivotally connected by a thin plate 154 of spring metal to the pole piece 143, its contact carrying end lying close to the pole piece 144 when the contact 152 is in engagement with contact 150. The rod is tensioned by the pivot plate 154 to hold the movable contact away from the fixed contact. Current is supplied to the magnet coil from a connecting fitting 155 mounted in an opening in plate 60, to the terminals of which connection is made from a suitable source of direct current, and from which connecting wires *a* and *b* lead, one to the fixed contact plate 151 and thence through the contacts and the rod 153 to the pole piece 143 and the magnet core, and the other to one end of the coil, the other end of the coil being connected to the core.

A connecting bar 156 extends between the armature 141 and the rod 153, the bar being pivotally connected to the armature and having a lost motion connection with the rod 153 provided by means of a T-lug 157 which extends through a slot 158 in the bar. During the first part of the inward movement of the armature 141 the rod 153 is held in its circuit-closing position by the magnet until the end of the slot 158 engages the stud 157; then by continued movement of the armature the rod is moved to carry the movable contact away from the fixed contact, thereby breaking the magnet circuit. The armature is then retracted by its spring 160, and during the first part of the retracting movement of the armature rod 153 remains in its open-circuit position until, just before the outward movement of the armature is completed, the T-lug 157 is again engaged by the bar 156 and the rod is then moved against the tension of its pivot spring plate 154 to carry the movable contact into engagement with the fixed contact, thereby reestablishing the magnet circuit. A small disc 161 eccentrically pivoted on the bar 156 can be turned on its pivot to extend more or less over the inner end of the slot 158 to vary the length of the slot and thereby to vary the point in the movement of the armature at which the magnet circuit is broken.

The pump piston will thus be reciprocated by the vibratory movement of armature 141, the compression stroke of the piston being made by the power of the spring 160. The tension of the spring should be sufficient to maintain air pressure in the pressure tube 32 sufficient to force air through the tube against the hydrostatic pressure at the outlet end of the immersion tube to bubble up slowly through the tank liquid. The size of the restricting orifices in the outlets of the pump is such that only a very small air flow can pass through the pressure tube 32 and static tube 40, and any excess pressure which builds up in the pressure chamber of the pump will thus determine the speed of movement of the pump piston on its power stroke under force of the spring 160. This tendency of the pressure to build up in the power chamber of the pump, because of the slow flow of air permitted through the restricted outlet orifices, will thus limit the rate of reciprocation of the pump and vibration of the motor armature, with the result that the current consumption of the motor is kept very low.

It is to be understood that the invention is not limited to the exact construction, arrangement and combination of parts shown by the drawings and to which the foregoing description has been largely confined, but that it includes changes and modifications thereof within the claims, and that certain features of the invention as claimed may be employed independently of other features thereof and in apparatus differing widely from that shown.

What is claimed is:

1. An apparatus for measuring the liquid in a container, comprising a sealed chamber, a pressure gauge having its pressure-responsive element mounted in said chamber, a pressure tube for connecting the pressure-responsive element of the gauge with a point below the liquid level in the container the liquid in which is to be measured, a pressure equalizing tube for connecting the sealed chamber with the space in the container above the liquid level, an air pump the pressure chamber of which is connected to each of said tubes through a restricted orifice and a check valve disposed at the container end of each of said tubes, each said check valve being arranged to be normally open to the passage of air therethrough but closing automatically upon the passage of a liquid therethrough from the container, the said pressure tube being continued beyond its check valve by an immersion tube to extend down into the liquid.

2. An apparatus for measuring the liquid in a container, comprising a sealed chamber, a pressure gauge having its pressure-responsive element mounted in said chamber, a pressure tube for connecting the pressure-responsive element of the gauge with a point below the liquid level in the container the liquid in which is to be meastured, a pressure equalizing tube for connecting the sealed chamber with the space in the container above the liquid level, an air pump the pressure chamber of which is connected to each of said tubes through a restricted orifice, and means providing a trap chamber at the container end of each of said tubes, said means including a check valve arranged to be normally open to the passage of air therethrough but closing automatically upon the passage of a liquid therethrough from the container, the said pressure tube being continued beyond its check valve by an immersion tube to extend down into the liquid.

3. An apparatus for measuring the liquid in a container, comprising a sealed chamber, a pressure gauge having its pressure-responsive element mounted in said chamber, a pressure tube for connecting the pressure-responsive element of the gauge with a point below the liquid level in the container the liquid in which is to be measured, a pressure equalizing tube for connecting the sealed chamber with the space in the container above the liquid level, an air pump the pressure chamber of which is connected to each of said tubes through a restricted orifice, and a device for attachment to the container comprising a casing partitioned to provide two sealed trap chambers to one of which the pressure tube connects and to the other of which the equalizing tube connects, means providing an air flow opening through the bottom of each trap chamber, means permitting air flow through said air flow opening of each trap chamber and preventing reverse flow of liquid therethrough, and an immersion tube extending from the air flow opening of the trap chamber to which the pressure tube is connected.

4. Apparatus as claimed in claim 3, in which the immersion tube is adjustable for varying the distance it extends from the bottom of the casing.

5. An apparatus for measuring the liquid in a container, comprising a pressure gauge, a pressure tube for connecting the pressure gauge with a point below the liquid level in the container the liquid in which is to be measured, an air pump the pressure chamber of which is connected with said tube through a restricted orifice, and a device for attachment to the container comprising a casing providing a sealed trap chamber to which the pressure tube connects, a valve body secured in an opening in the bottom of the trap chamber and having an air flow opening therethrough, a valve in said valve body which seats against an annular seat in the valve body, valve controlling means including a tiltable weight in said casing whereby when the weight is in its normal position the valve is open and when the weight is tilted the valve is closed, and an immersion tube extending from the air flow opening of the valve body.

6. An apparatus for measuring the liquid in a container, comprising a pressure gauge, a pressure tube for connecting the pressure gauge with a point below the liquid level in the container the liquid in which is to be measured, an air pump the pressure chamber of which is connected with said tube through a restricted orifice, and a device for attachment to the container comprising a casing providing a sealed trap chamber to which the pressure tube connects, a valve body secured in an opening in the bottom of the trap chamber and having an air flow opening therethrough, a spring-pressed valve in said valve body seating against an annular seat in the valve body, the valve being fast on a slidably guided valve rod, a tiltable weight in said casing which normally seats on a seat at the top of the valve body and holds the valve open by engagement with the end of the valve rod and when tilted or moved away from its seat permits the valve to be closed by its spring, and an immersion tube extending from the air flow opening of the valve body.

7. An apparatus for measuring the liquid in a container, comprising a pressure gauge, a pressure tube for connecting the pressure gauge with a point below the liquid level in the container the liquid in which is to be measured, an air pump the pressure chamber of which is connected with said tube through a restricted orifice, and a device for attachment to the container comprising a casing providing a sealed trap chamber to which the pressure tube connects, a valve body secured in an opening in the bottom of the trap chamber and having an air flow opening therethrough, a spring-pressed valve in said valve body seating against an annular seat in the valve body, the valve being fast on a slidably guided valve rod, a tiltable weight in the form of a ball in said casing which normally seats on an annular seat at the top of the valve body and holds the valve open by engagement with the end of the valve rod, the valve being closed by its spring when the ball tilts or moves away from its seat, means for limiting movement of the ball from its normal position comprising a plurality of spaced engagement members, and an immersion tube extending from the air flow opening of the valve body.

8. An apparatus for measuring the liquid in a container, comprising a pressure gauge, a pressure tube for connecting the pressure gauge with a point below the liquid level in the container the liquid in which is to be measured, an air pump the pressure chamber of which is connected with said tube through a restricted orifice, and a device for attachment to the container comprising a casing providing a sealed trap chamber to which the pressure tube connects, a valve body secured in an opening in the bottom of the trap chamber and having an air flow opening therethrough, a spring-pressed valve in said valve body seating against an annular seat in the valve body, the valve being fast on a slidably guided valve rod, a tiltable weight in the form of a ball in said casing which normally seats on an annular seat at the top of the valve body and holds the valve open by engagement with the end of the valve rod, the valve being closed by its spring when the ball tilts or moves away from its seat, means for limiting tilting movement of the ball on its seat, a tube extending downward within the trap chamber through which connection is made from the pressure tube to the trap chamber and the end of which serves as a stop to limit movement of the ball away from its seat, and an immersion tube extending from the air flow opening of the valve body.

9. An apparatus for measuring the liquid in a container, comprising a sealed chamber, a pressure gauge having its pressure-responsive element mounted in said chamber, a pressure tube for connecting the pressure-responsive element of the gauge with a point below the liquid level in the container the liquid in which is to be measured, a pressure equalizing tube for connecting the sealed chamber with the space in the container above the liquid level, an air pump the pressure chamber of which is connected to each of said tubes through a restricted orifice, and a device for attachment to the container comprising a casing partitioned to provide two sealed trap chambers to one of which the pressure tube connects and to the other of which the pressure equalizing tube connects, a valve body secured in an opening in the bottom of each of the trap chambers and having an air flow opening therethrough, a spring-pressed valve in each of said valve bodies, seating against a seat in the valve body, each valve being fast on a slidably guided valve rod, a tiltable weight in each trap chamber which normally seats on a seat at the top of the valve body and holds the valve open by engagement with the end of the valve rod and when it tilts or moves away from the seat permits the valve to be closed by its spring, and an immersion tube extending from the valve body of the trap chamber to which the pressure tube is connected.

CHARLES F. WALLACE.

REFERENCES CITED

The following references are of record in the file of this patent:

UNITED STATES PATENTS

| Number | Name | Date |
|---|---|---|
| 1,555,235 | Weymann | Sept. 29, 1925 |
| 1,711,506 | Titterington | May 7, 1929 |
| 1,789,694 | Berman | Jan. 20, 1931 |
| 1,815,001 | Beecher | July 14, 1931 |
| 1,832,380 | Goldman | Nov. 17, 1931 |
| 1,927,758 | Scheel et al. | Sept. 19, 1933 |
| 1,978,866 | Konig | Oct. 30, 1934 |
| 1,978,987 | Colvin | Oct. 30, 1934 |
| 1,983,026 | Greenleaf | Dec. 4, 1934 |
| 1,996,160 | Konig | Apr. 2, 1935 |
| 2,001,853 | Seward | May 21, 1935 |
| 2,082,606 | Woodbridge | June 1, 1937 |
| 2,113,454 | Mitchell | Apr. 5, 1938 |
| 2,132,224 | Snyder | Oct. 4, 1938 |
| 2,232,279 | Snyder | Feb. 18, 1941 |
| 2,293,542 | Hamilton | Aug. 18, 1942 |
| 2,391,852 | Winton | Dec. 25, 1945 |

FOREIGN PATENTS

| Number | Country | Date |
|---|---|---|
| 29,531 | France | May 12, 1935 |
| 398,082 | Great Britain | Sept. 7, 1933 |
| 540,878 | Great Britain | Nov. 4, 1941 |
| 631,254 | France | Sept. 12, 1937 |
| 818,982 | France | June 28, 1937 |

Certificate of Correction

Patent No. 2,455,200.  November 30, 1948.

CHARLES F. WALLACE

It is hereby certified that errors appear in the printed specification of the above numbered patent requiring correction as follows:

Column 1, line 35, for the words "or airplanes" read *of airplanes*; column 8, line 49, for "mighth" read *might*; column 14, line 3, list of references cited, for the name "Berman" read *Beman*; line 21, for the date "May 12, 1935" read *May 12, 1925*; line 24, for "Sept. 12, 1937" read *Sept. 12, 1927*;

and that the said Letters Patent should be read with these corrections therein that the same may conform to the record of the case in the Patent Office.

Signed and sealed this 24th day of May, A. D. 1949.

[SEAL]

THOMAS F. MURPHY,
*Assistant Commissioner of Patents.*